United States Patent
Rasheed et al.

(10) Patent No.: US 7,340,531 B2
(45) Date of Patent: Mar. 4, 2008

(54) APPARATUS AND METHOD FOR DATA TRANSFER

(75) Inventors: Yasser Rasheed, Hillsboro, OR (US); Russell J. Fenger, Beaverton, OR (US); Pankaj N. Parmar, Beaverton, OR (US); Shriharsha S. Hegde, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 889 days.

(21) Appl. No.: 10/260,230

(22) Filed: Sep. 27, 2002

(65) Prior Publication Data

US 2004/0064575 A1 Apr. 1, 2004

(51) Int. Cl.
G06F 17/30 (2006.01)

(52) U.S. Cl. .................. 709/232; 709/225; 707/10; 707/201; 707/203

(58) Field of Classification Search ............. 709/219, 709/225, 240, 318, 201–205, 232, 301; 719/310; 707/224, 1–10, 203; 717/168–178; 386/46, 386/109, 125; 715/503, 511
See application file for complete search history.

(56) References Cited

U.S. PATENT DOCUMENTS

| | | | |
|---|---|---|---|
| 6,397,282 B1 * | 5/2002 | Hashimoto et al. ......... 710/260 |
| 6,681,252 B1 * | 1/2004 | Schuster et al. ............ 709/227 |
| 6,704,489 B1 * | 3/2004 | Kurauchi et al. ............. 386/46 |
| 6,742,023 B1 * | 5/2004 | Fanning et al. ............. 709/219 |
| 6,782,403 B1 * | 8/2004 | Kino et al. ................. 707/203 |
| 6,795,429 B1 * | 9/2004 | Schuster et al. ............ 370/352 |
| 6,901,594 B1 * | 5/2005 | Cain et al. .................. 719/310 |

* cited by examiner

Primary Examiner—David Wiley
Assistant Examiner—Jude J Jean-Gilles
(74) Attorney, Agent, or Firm—Fish & Richardson P.C.

(57) ABSTRACT

A method including matching a data transmission characteristic of a first application on a first network device and of a second application on a second network device, requesting a prioritized data transfer between the first and second applications from a policy manager application, determining whether to approve the requested prioritized data transfer based upon a set of policy rules, and transferring data between the first and second application with preferential treatment.

26 Claims, 3 Drawing Sheets

APPARATUS AND METHOD FOR DATA TRANSFER

TECHNICAL FIELD

This application relates to transferring data.

BACKGROUND

Many residences and businesses include a network of inter-connected devices ("network devices") that are able to communicate with each other using a communications protocol, such as Internet Protocol (IP). The network devices may use one or more communications links for communicating with each other, e.g., transmitting messages and data on a cable line, a phone line or via wireless transmissions. The network devices may include personal computers (PCs), work station computers, media display devices, audio devices, telephones, and wireless devices, for example. In some cases the network is implemented as a peer-to-peer network, with devices communicating directly to other devices. In other cases, a network may include a gateway device (or router device) that operates as a data forwarding device, i.e., receiving data from a first network device and forwarding that data to another network device. The gateway device may also be coupled to communicate with another network of devices, such as a wide area network (WAN), i.e., the Internet.

A network of inter-connected devices installed at a home or business is sometimes referred to as a Small Office or Home Office (SOHO) network. The data transferred between network devices is sometimes referred to as "media", which refers to the various types of information that may be represented by the data, for example, text, pictures, video and voice.

UPnP™ refers to an industry-standard architecture that may be used by applications executing on networked devices to advertise, discover and control services that are available on those networked devices. A network device executing a UPnP™ application may announce its presence on a SOHO network and advertise the services available on that device. UPnP™ architecture also includes a definition of a "control point" which refers to a device that is capable of discovering and controlling services on other devices executing a UPnP™ application.

UPnP™ messages are typically sent on a network communications link using industry-standard protocols, such as Internet Protocol (IP) and Hyper Text Transfer Protocol (HTTP).

UPnP™ architecture includes a variety of terms to refer to physical and logical objects. Each physical device may have embedded physical or logical devices, for example, a combination TV/VCR player may have two embedded devices, one for the TV monitor/display component and a second for the VCR/tape-player component. Each physical device, or embedded device, will include an associated service (or services) that refer to the functions that may be performed by that device.

DESCRIPTION

As used herein, the term "computer system" refers to a physical machine having one or more processing elements and one or more storage elements in communication with the one or more of the processing elements. Each of the various user devices and computers described herein include an operating system (OS). The OS is software that controls the computer system's operation and the allocation of resources. The term "process" or "program" refers to software, for example an application program that may be executed on a computer system. The application program is the set of executable instructions that performs a task desired by the user, using computer resources made available through the OS.

The description contained herein presents at least one embodiment in which information is passed between a user and a user device, e.g., a computer system, using conventional means such as a keyboard, a mouse, a physical transducer (e.g., a microphone), etc. However, this is not meant to preclude the use of other mechanisms for passage of information between a user and a computer system.

Figure 1:
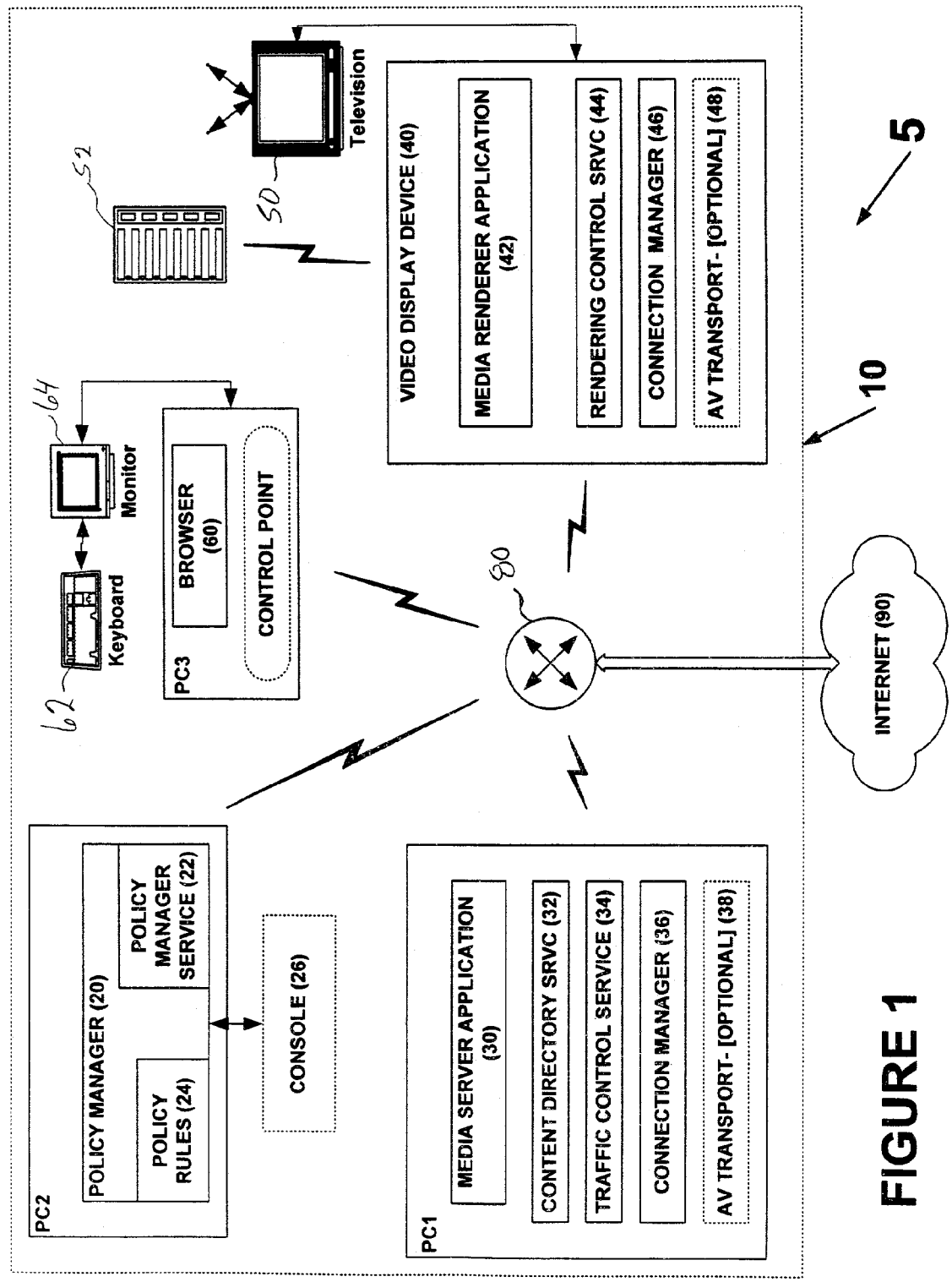
FIG. 1 is a block diagram of a data transfer system.

Referring to FIG. 1, a data transfer system 5 includes a SOHO network 10 that allows prioritized data transfers between two network devices, i.e., giving preferential treatment to data transfers between applications executing on those devices. Each prioritized data transfer session (PDTS) is initiated by a network device, acting as a control point, that requests approval from a policy manager 20 to establish the PDTS. If the PDTS is approved by policy manager 20, the control point sends a message to a traffic control service 34 that is associated with the application that will be sending the data (the "sending application"). To apply preferential treatment to data sent from the sending application, traffic control service 34 programs a traffic control module (not shown) of the operating system (OS). The traffic control module refers to software that performs, for example, traffic shaping, scheduling, filtering, and/or flow control to data sent (and received) by a network device.

In an embodiment, the traffic control module is programmed via calls to an application programming interface (API). For example, the API for the traffic control module may include calls to setup "flows" and/or "filters", where filters refers to classification criteria for the data packets and flows refers to actions to perform on those data packets. In an embodiment, the traffic control module of the operating system classifies and/or tags data from the sending application, i.e., the PDTS data. The classification and/or tag is usable by other network devices in SOHO network 10 to provide preferential treatment to that data.

In this example, SOHO network 10 includes four network devices: three personal computers (PC1-PC3), and a video display device 40, all of which communicate with each other using wireless transmissions through a wireless gateway device 80. Gateway 80 includes a connection to a Wide Area Network, in this case Internet 90. PC1, PC2 and video display device 40 each include at least one service that is advertised on the network and used by PC3, acting as a control point, to determine available data and to request and establish a PDTS, as will be explained. PC1 includes a media server application 30 that may be used to send video data to another network device on the SOHO network. Video display device 40 is coupled to television 50 and controlled by a remote controller 52. Video display device 40 includes a media rendering application 42 which may be used to output audio and video data to television 50.

In a typical SOHO network, several data transfer sessions may be occurring simultaneously, e.g., between two or more applications executing on network devices and/or between a network device and a device connected to a wide area network (WAN), such as Internet 90. Each application may require a different Quality of Service (QOS) for its data transfer session to ensure a satisfactory performance to a user of the application. QOS refers to the bandwidth, latency and/or error rate of a data transfer session between two devices, or between applications executing on those devices. As an example, media rendering application 42 executing on video display device 40 and receiving video data from media server application 30, typically would require a relatively high QOS level of bandwidth and/or low latency as compared to a browser application 60 executing on PC3 and receiving data from Internet 90. If the combined data traffic for two or more data transfer sessions exceeds the bandwidth of the network, congestion may occur at some point in the network, such as through gateway 80. Therefore, an application may not be able to send and/or receive data at a QOS level required to provide satisfactory performance to a user. In an embodiment, a prioritized data transfer session may be established between two applications executing on a SOHO network that causes data corresponding to that PDTS to be given preferential treatment when being transmitted on the network. The preferential treatment allows data for an application to be given a relatively higher QOS and preferential treatment over data for other applications in the network.

In this example of network 10, PC2 includes a policy manager application 20 that includes policy manager service 22 and a set of policy rules 24 ("the policy"). Policy rules 24 may be stored on a storage medium that is accessible to PC2 (not shown). Examples of policy rules may include: all video data traffic gets the highest priority available, audio traffic from any device that is directed to an audio playing device in a living room takes precedence over audio traffic directed to a child's room, browser data traffic gets lowest priority ("best effort" handling), etc.

In an embodiment, a network device executing a UPnP™ application may create and maintain a device description document that includes information describing the services and/or embedded devices available on that device. For example, a multi-media player might include a tape transport service, a tuner service, and a clock service. For each available service, the device will have a service description document that includes the set of actions that may be performed by the service, as well as the current state of those actions using a set of state variables. The device description document includes a pointer, such as a Uniform Resource Locator (URL), to identify the location of each corresponding service description document. These description documents are typically formatted using Extensible Markup Language (XML), and may be displayed as web-pages using a browser program.

Typically, a service available on a device executing a UPnP™ application also includes a state table (as described in the service description document), a control server and an event server. The state table includes the current state of each variable declared in the service description document. For each action request received, the control server executes those requested actions (if possible), updates any affected state variables in the state table as necessary, and responds to the requestor of the action request to indicate completion or failure of the requested action. The event server sends ("publishes") an event message to other networked devices that have previously subscribed to receive notification of a change to a specific state variable.

As described previously, UPnP™ architecture includes a definition of a "control point" which refers to a network device that is capable of discovering and controlling services on other network devices. For example, a control point may discover a service and retrieve its description document, and based on the allowable actions indicated in the service description document, and the current state of those actions, the control point may send an action request to the control server for that service.

The following example of establishing a prioritized data session between two network devices will illustrate the operations of various components of system 5. In this example, policy rules 24 have been stored on PC2, and reflect the following priorities: highest priority handling is to be given to video data transfers destined for video display device 40, while all other data transfers are to be handled as best effort. The services available on the network devices are either advertised by each network device, or discovered by a search request message sent by a control point. In this example, PC3 acts as control point, e.g, discovering and/or controlling the various services available on network 10. A user interacts with an input/output device, in this example, keyboard 62 coupled to PC3, to cause PC3 to determine available video data (e.g., movies) from a content directory service 32 on PC1. Content directory service 32 provides a listing ("a directory") of available video data that is displayed on a monitor 64 connected to PC3. The user may select a movie from the listing displayed on monitor 64. In an embodiment, content directory service 32 also enumerates any QOS requirements ("data transmission characteristics") that correspond to an available video data selection. A connection manager 36 enumerates device capabilities of PC1, such as a supported data transfer protocol, a media codec, etc., that may be used for data transfers to and from PC1. In operation, control point (PC3) retrieves and matches a data transmission characteristic for a selected data stream from content directory service 32, and/or retrieves and determines a matching data transfer protocol and/or media format for transferring data between media server application 30 and media rendering application 42. For example, application 30 and 42 may both support a MPEG2 media format, and/or a streaming protocol, and/or a specific bit-rate of transmission. Control point (PC3) sends a PDTS request to the policy manager service 22, the request including data to specify the sending and receiving devices and/or applications on those devices. The PDTS request may also include data to specify the determined matching data transmission characteristic and/or matching data transfer protocol, and/or matching media format. Policy manager application 20 determines whether to approve or deny the PDTS request based on policy rules 24 (a PDTS request approval or denial may also be based, in part, on a "dynamic state" of network resources, as will be explained). If the PDTS is approved, policy manager application 20 may also determine a priority level for the PDTS. In this case, it is determined that policy rules 24 allow the requested PDTS at a specific priority level. Policy manager service 22 sends an approval message to the control point, i.e., PC3. When the control point has received the PDTS approval message, the control point sends a control message to traffic control service 34 to indicate the approved PDTS characteristics. The control message from the control point may include the determined matching data transmission characteristic, and/ or matching data protocol, and/or media format (e.g., priority-based QOS, MPEG2 and/or a streaming protocol). The control message may also include the specific priority level of the PDTS that was sent by policy manager service 22. As described previously, traffic control service 34 interacts with the traffic control module of the OS to establish traffic control for subsequent data transmission corresponding to the approved PDTS.

Control point (PC3) may interact with an optional AV transport service 38 on PC1, e.g., sending control messages to AV transport service 38 to cause the selected movie to be played, stopped, paused, re-wound, etc. Control point (PC3) may also interact with rendering control service 44 on video display device 40, e.g., sending control messages to cause changes in volume, brightness, contrast, etc. of the rendered audio and/or video to television 50.

As data corresponding to the PDTS is sent from media server application 30, the traffic control module of the OS applies prioritized handling of that data, e.g., performing at least one of shaping, filtering, scheduling and/or tagging the data. As an example, the traffic control module may classify data packets using a "filter" algorithm and take actions to the filtered data based upon "data flow" criteria. Filtering criteria may include, e.g., a combination of a source IP address, a destination IP address, a port number and a protocol type. The traffic control may also apply prioritized handling of the PDTS data including sending a priority tag, or mark, in at least one data packet, or at least one header packet corresponding to a data packet. The priority tag is usable by gateway device 80 (and other network devices) to determine whether preferential treatment is to be applied to a data packet.

As described previously, the traffic control module of the operating system refers to software that performs traffic shaping, scheduling, filtering, and flow control, for example. As an example, packet tagging may be performed by a Layer3 traffic control module, i.e., using IP Type of Service (ToS) tagging. As another example, packet tagging may be performed by a Layer2 driver, e.g., using 802.1p tags (e.g., switched Ethernet networking), or 802.11e tags (e.g., wireless 802.11 networking). 802.1p and 802.11e both refer to either existing or proposed communication standards (and/or protocols) of the Institute of Electrical and Electronics Engineers (IEEE).

In an embodiment, at least one of traffic control service 34, content directory service 32, rendering control service 44, and policy manager service 22 are implemented as UPnP™ services. Each of these services is, therefore, discoverable and/or controllable by a network device that is acting as a UPnP™ control point.

Figure 2:
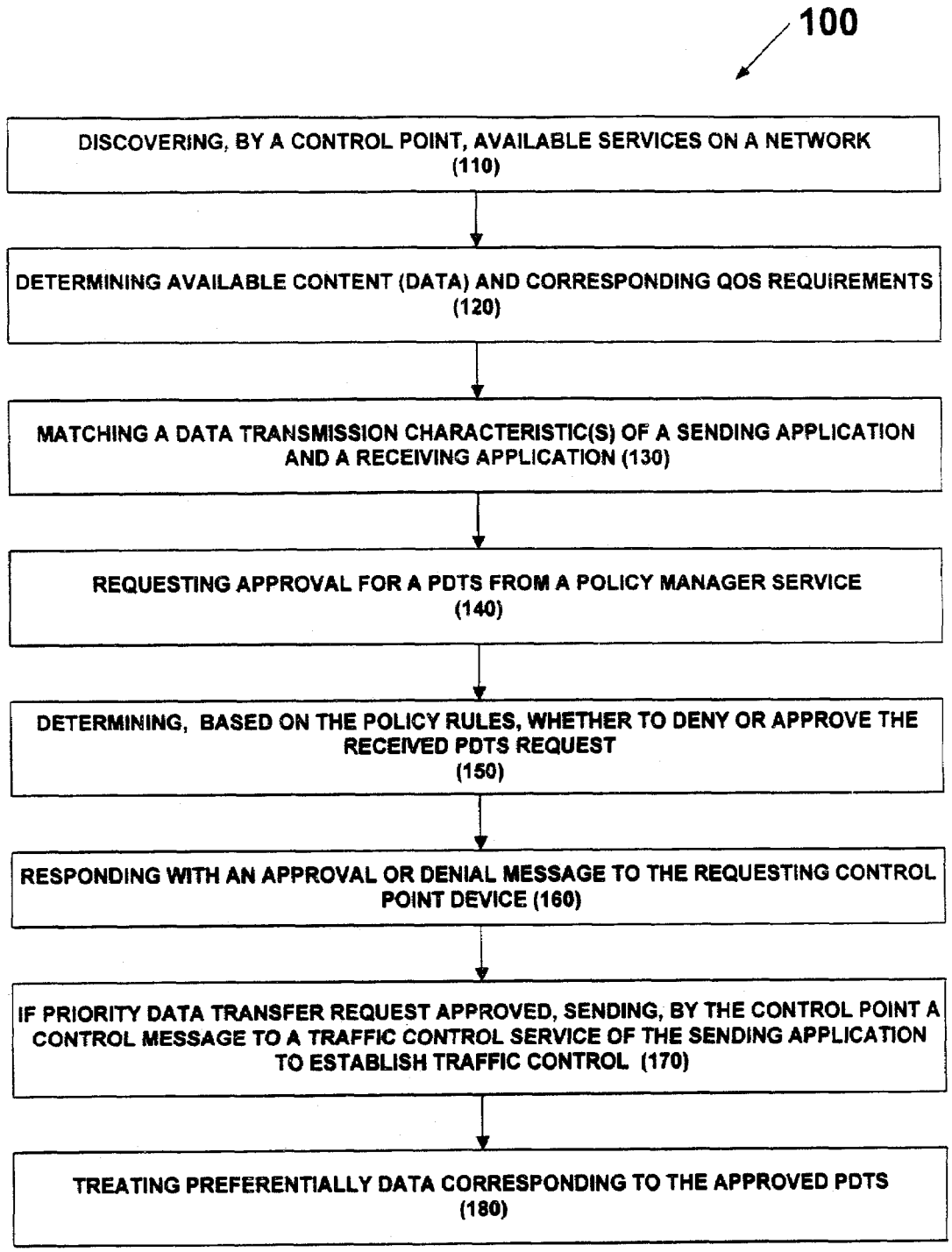
FIG. 2 is a flowchart showing a process for establishing a prioritized transfer of data according to one embodiment of the invention.

Referring to FIG. 2, a method 100 is shown for establishing a prioritized data transfer session between two applications executing on two network devices. Method 100 includes discovering (110), by a control point on the network, available services on a network, determining (120) available content (e.g., data) that may be sent by a first application and determining a data transmission requirement corresponding to data transmissions from that first application, matching (130) a data transmission characteristic between the first application ("sending application") and a receiving application, requesting (140) from a policy manager service, a PDTS, determining (150) whether the requested PDTS is allowable based upon the policy rules, responding (160) with an approval or denial message, if the PDTS is approved, sending (170), by the control point, a control message to a traffic control service that corresponds to the sending application, and treating (180) preferentially data traffic that corresponds to the approved PDTS.

Gateway 80 may be implemented in a variety of ways and may perform gateway functions based on a variety of protocols. For example, gateway 80 may be implemented as a device that performs only gateway functions, or may be implemented as a device that performs additional functions, such as a PC. In an embodiment, gateway 80 participates in a PDTS by giving preferential treatment to identifiable data flows. For example, gateway 80 may determine data flows and handling priorities based on an IEEE 802.1p protocol (sometimes referred to as a (802.1p-Enabled Residential Gateway), or an IEEE 802.11e protocol (sometimes referred to as a an 802.11e-enabled Wireless Access Point protocol, or "WAP"). For each data packet that is not identifiable as data requiring preferential treatment, (and does not include a priority tag), gateway 80 will handle that data packet based on a "best effort" protocol.

In an embodiment, system 5 includes an optional console device 26 coupled to PC2 that allows a user to interact with policy manager 20 to access and/or change policy rules 24. Alternatively, access and/or changes to policy rules 24 are made by an application executing on another network device on SOHO network 10.

When a change is made to policy rules 24, policy manager service 22 generates an event message to all subscribing control points. The control points may then retrieve an updated policy service description document.

In some examples, policy manager 20 and/or policy rules 24 are stored on a device outside of SOHO network 10, for example, stored on a computer (not shown) on Internet 90. In this case, a policy proxy (not shown) may be transferred from the computer on Internet 90 to a network device on the SOHO network 10, and the policy proxy is used by policy manager service 22 to determine whether to approve or deny a received prioritized data transfer request. The policy proxy acts as a representative of the external policy manager in the SOHO network, e.g., policy manager service 22 would then interact with the policy proxy on SOHO network 10 to obtain the policy rules and PDTS approvals or denials.

In an embodiment, policy manager 20 determines a "dynamic resource state" that reflects the state of at least one network device on network 10. For example, policy manager 20 may determine the bit-rate of a data transmission, lost connections, devices joining and/or leaving the network, and available bandwidth on the network based upon existing data transfer sessions occurring on the network. In an embodiment, policy manager 20 and/or policy manager service 22 sends a test data packet on the network to determine a dynamic resource state of at least one network device (and/or an associated application) on SOHO network 10. As stated previously, a denial or approval of a PDTS request may be based, in part, on the determined "dynamic state" of the SOHO network.

In an embodiment, policy manager application 20 may be located on any network device in SOHO network 10. For example, policy manager application 20 may be located on PC1 or PC3 and respond to a PDTS request sent by any network device on SOHO network 10.

SOHO network 10 is one example of a residential or business network. However, SOHO network 10 may be implemented to include multiple network segments, e.g., a first network segment including at least one network device and connected to a gateway device, the gateway device connected to a second network segment, and so forth. In this case, the network devices in each network segment may establish prioritized data transfers using a control point and services as described previously.

In the described embodiments, the device acting as the control point was a PC. However, other devices that are capable of communicating with devices on a SOHO network could act as a control point, for example, PC1 or PC2 may act as a control point. Also, as another example, remote controller 52 may interact with video display device 40 and act as a control point. In more detail, a user may respond to choices displayed on TV 50 by depressing buttons on remote controller 52. Depressing the buttons causes signals to be sent to video display device 40, which receives and interprets those signals and causes video display device 40 to interact with the various services available on the network, and to display available media content on TV 50.

A web-page may be used as a service description document and a control point may cause the retrieval of that description document and load that document into a browser for viewing. Depending on the capabilities of the web-page, a user may be able to make changes/selections on the displayed web-page. The changes/selections made by the user are used by the control point device to determine messages sent to other network devices to establish a PDTS between two network devices.

Figure 3:
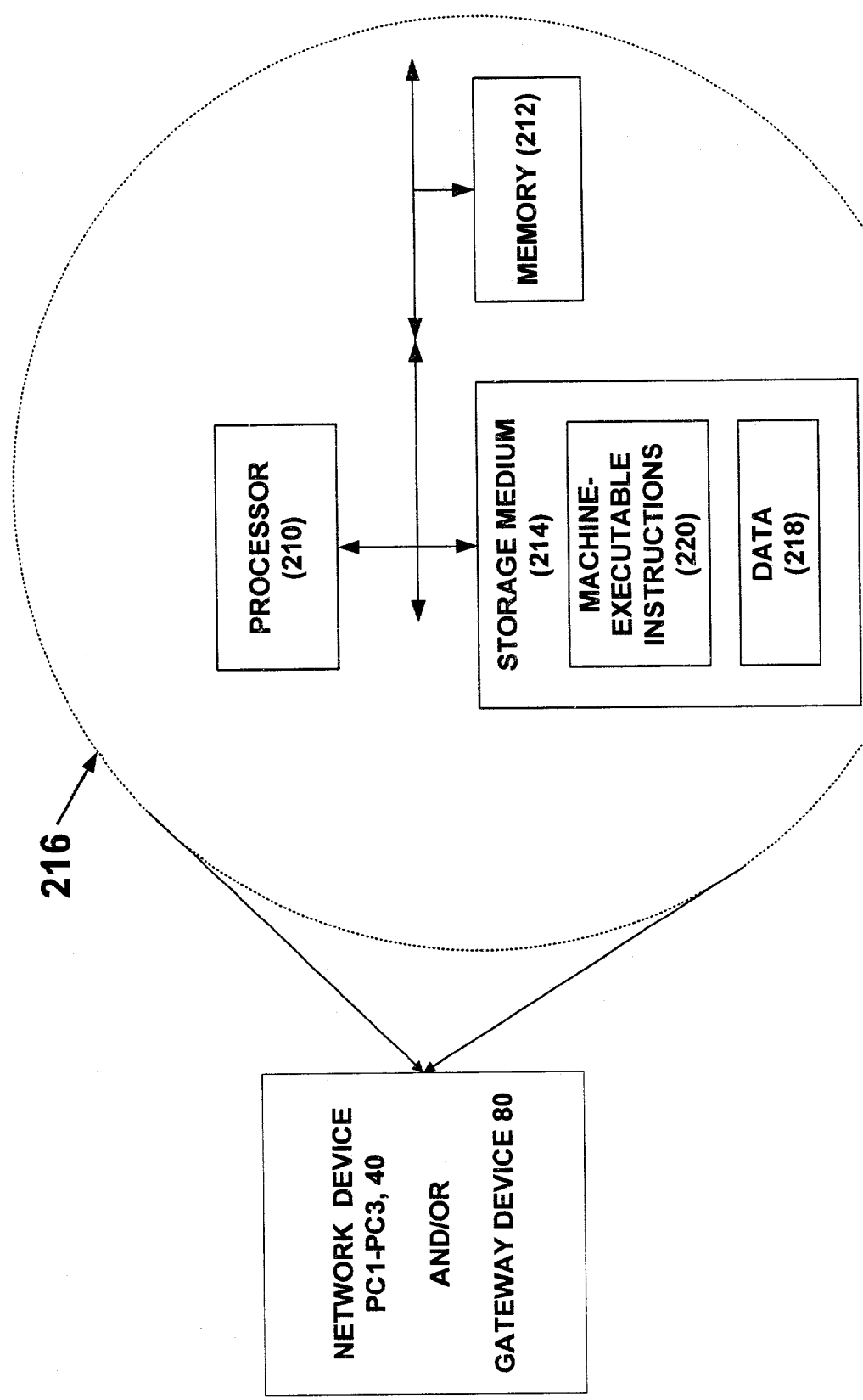
FIG. 3 is a block diagram of computer hardware on which the process of FIG. 2 may be implemented.

Referring to FIG. 3, in an embodiment of system 5, each network device and gateway device may include a processor 210, a memory 212, and a storage medium 214 (see view 216). Storage medium 214 stores data 218 for description documents and also stores machine-executable instructions 220 that are executed by processor 210 out of memory 212 to perform gateway functions, and network device functions. Furthermore, each network device and/or gateway device may include an operating system that may send and/or receive standard protocol messages and data.

Network devices and/or gateway device 80 are not limited to use with the hardware and software of FIG. 3. It may find applicability in any computing or processing environment. They may be implemented in hardware, software, or a combination of the two. They may be implemented in computer programs executing on programmable computers or other machines that each include a processor, a storage medium readable by the processor (including volatile and non-volatile memory and/or storage components), at least one input device, and one or more output devices. Program code may be applied to data entered using an input device (e.g., a mouse or keyboard) to perform applications and to generate output information.

Each computer program may be stored on a storage medium/article (e.g., CD-ROM, hard disk, or magnetic diskette) that is readable by a general or special purpose programmable computer for configuring and operating the computer when the storage medium or device is read by the computer to perform applications. They may also be implemented as a machine-readable storage medium, configured with a computer program, where, upon execution, instructions in the computer program cause a machine to operate in accordance with those applications.

The invention is not limited to the specific embodiments described above. For example, a network device may include an operating system that implements UPnP™ messaging without requiring a separate executable application. We described service description documents as being formatted based on XML, however, other data formats could be used.

Other embodiments not described herein are also within the scope of the following claims.

What is claimed is:

1. A method comprising:
    matching a data transmission characteristic of a first application on a first network device and of a second application on a second network device;
    requesting a prioritized data transfer between the first and second applications from a policy manager application, wherein said requesting comprises sending a prioritized data request message from a third application on one of the first and second network devices to the policy manager application on one of the first and second network devices;
    determining whether to approve the requested prioritized data transfer based upon a set of policy rules, wherein said determining comprises sending an approval or denial message to the third application from the policy manager application in response to the prioritized data request message; and
    transferring data between the first and second application with preferential treatment.

2. The method of claim 1, further comprises:
    determining an available data item stored on the first network device, the matched data transmission characteristic corresponding to the available data item.

3. The method of claim 1, wherein the policy rules are based upon at least one of a physical location of a network device, a type of network device, and a type of application on a network device.

4. The method of claim 1, wherein determining comprises determining based upon a resource state of a network device.

5. A method comprising:
    matching a data transmission characteristic of a first application on a first network device and of a second application on a second network device;
    requesting a prioritized data transfer between the first and second applications from a policy manager application;
    determining whether to approve the requested prioritized data transfer based upon a set of policy rules; and
    transferring data between the first and second application with preferential treatment, wherein transferring further comprises:
        sending a control message from a third application on one of the first and second network devices to a traffic control application on the first network device; and
        programming a traffic control module of an operating system on the first network device to apply preferential treatment to data transmissions corresponding to at least one of the available data item and the first application.

6. The method of claim 5, wherein the traffic control module applies one of traffic shaping, scheduling, filtering, and/or flow control to data corresponding to the data transmissions.

7. The method of claim 5, further comprising:
    tagging a data packet sent from the first network device, the tag usable by other network devices to determine whether to treat the data packet preferentially.

8. The method of claim 5, wherein the data transmissions comprise transmissions based on at least one of a 802.1p (IEEE) protocol, and 802.11e (IEEE) protocol.

9. The method of claim 1, wherein matching further comprises:
    matching at least one of a supported data transfer protocol, a media format, and a specific bit-rate of transmission.

10. The method of claim 2, further comprises:
determining an available data item using a content directory service application on the first network device.

11. The method of claim 1 or 5, wherein at least one of the policy manager application, the content directory application and the third application acting as a control point comprise UPnP™ architecture applications.

12. A storage medium having stored thereon instructions that when executed by a machine results in the following:
match a data transmission characteristic of a first application on a first network device and of a second application on a second network device;
request a prioritized data transfer between the first and second applications from a policy manager application, wherein requesting further comprises instructions that when executed by the machine results in sending a prioritized data request message from a third application on one of the first and second network devices to the policy manager application on one of the first and second network devices;
determine whether to approve the requested prioritized data transfer based upon a set of policy rules, wherein instructions that when executed by the machine results in determine comprises instructions that when executed by a machine results in sending an approval or denial message to the third application from the policy manager application in response to the prioritized data request message; and
transfer data between the first and second application with preferential treatment.

13. The medium of claim 12, further comprises instructions that when executed by a machine results in the following:
determine an available data item stored on the first network device, the matched data transmission characteristic corresponding to the available data item.

14. The medium of claim 12, wherein the policy rules are based upon at least one of a physical location of a network device, a type of network device, and a type of application on a network device.

15. The medium of claim 12, wherein instructions that when executed by a machine results in determining whether to approve the requested prioritized data transfer comprises instructions that when executed by a machine results in the following:
determine based upon a resource state of a network device.

16. A storage medium having stored thereon instructions that when executed by a machine results in the following:
match a data transmission characteristic of a first application on a first network device and of a second application on a second network device;
request a prioritized data transfer between the first and second applications from a policy manager application;
determine whether to approve the requested prioritized data transfer based upon a set of policy rules; and
transfer data between the first and second application with preferential treatment, wherein instructions that when executed by the machine results in transfer comprises instructions that when executed by the machine results in the following:
send a control message from a third application on one of the first and second network devices to a traffic control application on the first network device; and
program a traffic control module of an operating system on the first network device to apply preferential treatment to data transmissions corresponding to at least one of the available data item and the first application.

17. The medium of claim 16, wherein the traffic control module applies one of traffic shaping, scheduling, filtering, and/or flow control to data corresponding to the data transmissions.

18. The medium of claim 16, further comprising instructions that when executed by a machine results in the following:
tag a data packet sent from the first network device, the tag usable by other network devices to determine whether to treat the data packet preferentially.

19. The medium of claim 16, wherein the data transmissions comprise transmissions based on at least one of a 802.1p (IEEE) protocol, and 802.11e (IEEE) protocol.

20. The medium of claim 12, wherein instructions that when executed by a machine results in match comprises instructions that when executed by a machine results in the following:
match at least one of a supported data transfer protocol, a media format, and a specific bit-rate of transmission.

21. The medium of claim 13, further comprises instructions that when executed by a machine results in the following:
determine an available data item using a content directory service application on the first network device.

22. The medium of claim 12 or 16, wherein at least one of the policy manager application, the content directory application and the third application acting as a control point comprise UPnP™ architecture applications.

23. A system for transferring data comprising:
a first network device having a first application and a data item available for transfer to another network device; and
a second network device coupled to communicate with the first network device, the second network device having a second application;
a policy manager application and a set of policy rules on one of the first and second network devices; and
a third application on one of the first and second network devices,
wherein the third application determines a matching data transmission characteristic corresponding to at least one of the data item and the first application, and
wherein the third application requests a prioritized data transfer between the first application and the second application, the request being sent as a prioritized data request message from the third application to the policy manager application, and
wherein the policy manager determines whether to approve the requested prioritized data transfer based upon the set of policy rules, the determination comprising sending an approval or denial message to the third application from the policy manager application in response to the prioritized data request message.

24. The system of claim 23, wherein data corresponding to at least one of the first application and the data item is transferred from the first application with preferential treatment.

25. The system of claim 23, wherein the policy rules are based upon at least one of a physical location of a network device, a type of network device, and a type of application on a network device.

26. The system of claim 23, wherein at least one of the third application and the policy manager application comprise UPnP™ architecture applications.

* * * * *